Oct. 28, 1969    H. E. G. ARNESON ET AL    3,475,106
FLUID SELF-GOVERNING APPARATUS
Filed May 11, 1967
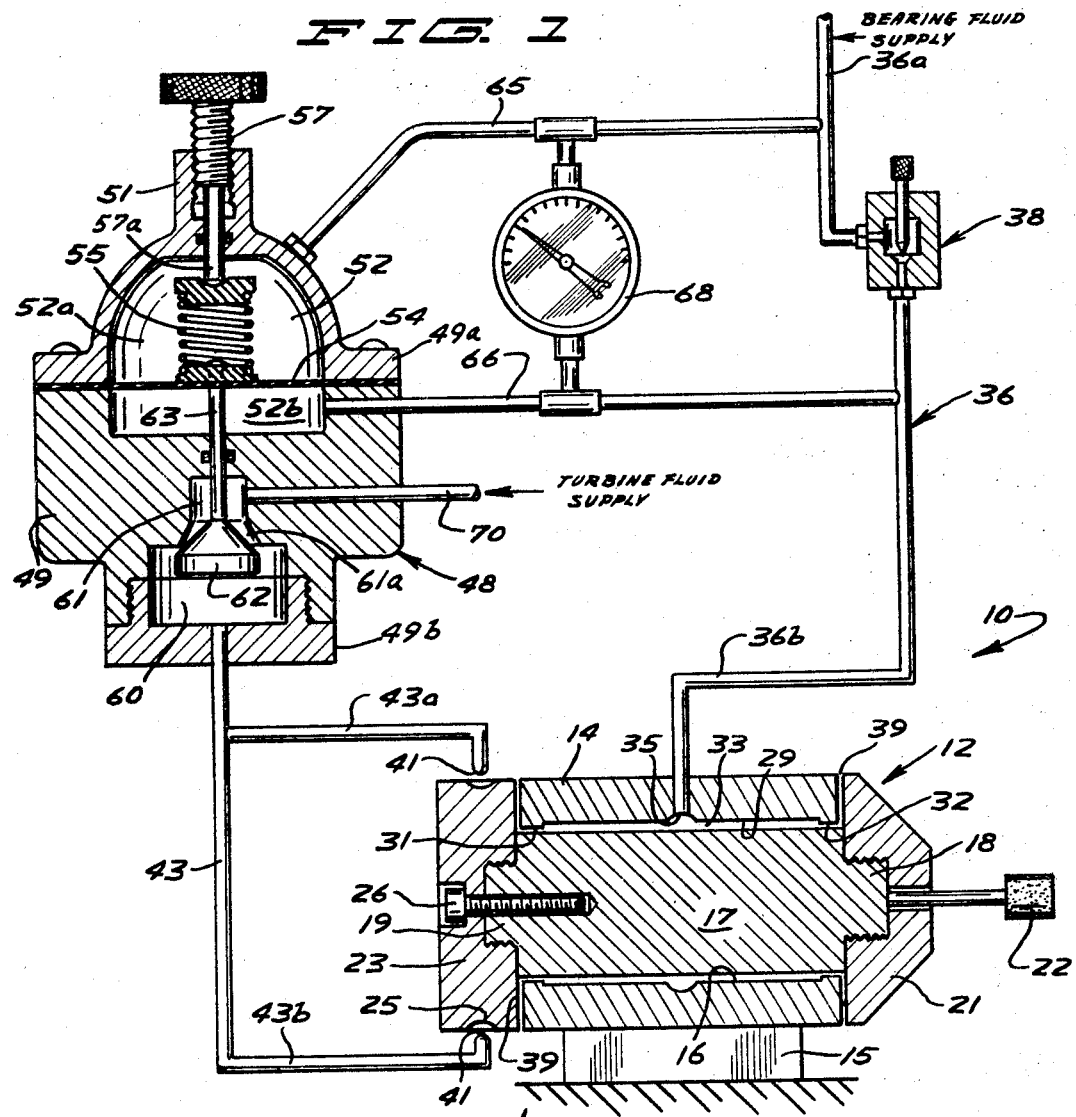
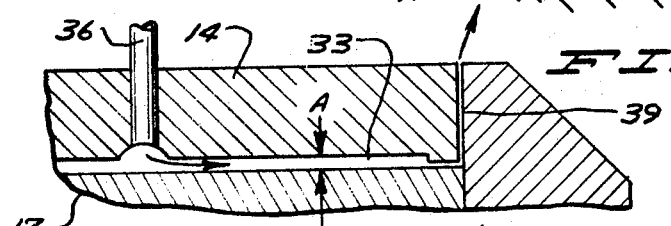
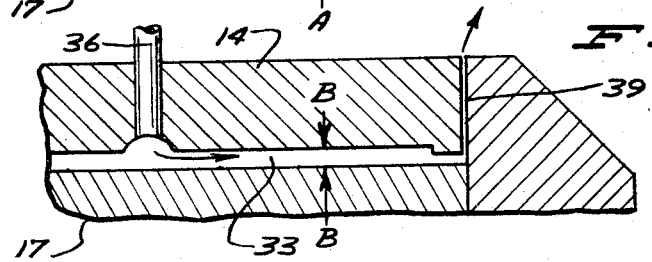
INVENTOR.
HAROLD E. G. ARNESON
THEODORE J. ARNESON, JR.
BY
ATTORNEYS United States Patent Office 3,475,106
Patented Oct. 28, 1969

3,475,106
FLUID SELF-GOVERNING APPARATUS
Harold E. G. Arneson, 2322 W. Lake of the Isles Blvd.,
and Theodore J. Arneson, Jr., 2101 Irving Ave. S., both
of Minneapolis, Minn. 55405
Filed May 11, 1967, Ser. No. 637,786
Int. Cl. F01d *17/06, 19/00, 21/14*
U.S. Cl. 415—14                                   5 Claims

ABSTRACT OF THE DISCLOSURE

A self-governing apparatus for maintaining a predetermined speed of operation comprising a rotor which as it changes in size, responsive to changes in its speed of rotation resulting from changes in its load, changes a feed back pressure to which a control member is responsive, which control member operates a valve governing the supply of fluid driving said rotor to provide such a supply as is required to stabilize or maintain a predetermined speed of rotation of said rotor irrespective of its load.

BACKGROUND AND SUMMARY OF INVENTION

This invention relates to a self-governing speed control apparatus embodying the use of a rotor with the apparatus being initially adjusted for a normal operation at a desired speed with the speed of the rotor being responsive to changes in its load to control the supply means used to drive the rotor to maintain said desired speed.

It is an object of this invention to provide an apparatus which may be characterized as a speed governing apparatus wherein the apparatus is initially adjusted for the normal operation of the rotor therein at a desired speed and with a variation of load on said rotor, it is maintained at said speed.

It is another object of this invention comprising an apparatus embodying the use of a rotor which carries a load wherein the power means driving said rotor is increased or decreased responsive to an increase or decrease in load to maintain said rotor at predetermined desired rate of speed.

More specifically, it is an object of this invention to provide a rotor in combination with a stator forming an annular clearance therebetween having an externally pressurized supply of fluid running thereto, means driving said rotor at a predetermined speed, a control member governing said driving means and a feed back pressure from said fluid supply operating said control member whereby with a change in load and a consequent change in speed and size of said rotor, said clearance is changed causing a change in said back pressure, and through said control means said driving means is changed to restore said predetermined speed.

These and other objects and advantages of the invention will be set forth in the following description made in connection with the accompanying drawings in which like reference characters refer to similar parts throughout the several views and in which:

FIG. 1 is a view in vertical section showing the apparatus comprising the invention herein; and FIGS. 2 and 3 are fragmentary views in vertical section on an enlarged scale showing a variation in clearance.

DESCRIPTION OF A PREFERRED EMBODIMENT

The apparatus comprising the subject matter of the embodiment of the invention disclosed herein is indicated generally by the reference numeral 10 and sufficient detail is shown for a fully adequate disclosure of the invention.

The essential portions of the invention comprise the bearing structure 12, the control member 48 and supply lines.

It will be understood that said bearing structure may be otherwise formed than as here shown.

Said bearing structure 12 comprises a stator 14 carried upon a supporting base 15. Mounted within the bore 16 of said stator is a rotor 17 having projecting threaded axial bosses or hubs 18 and 19. Secured to said boss 18 by being threaded thereonto is a cap member 21 which may be variously formed, but which is shown here as a frustrum, and is shown carrying an axially mounted tool 22 shown here as a grinder. Threaded onto said boss 19 is a cylindrical member 13 having a recessed locking screw 26 disposed therethrough and threaded into said rotor 17. Said member 23 comprises a turbine having formed therein extending peripherally thereabout a multiplicity of recesses 25 forming vanes or what might be regarded as turbine buckets. Although said turbine 23 is integral with said rotor 17, for purpose of description herein, separate reference is made to these elements as they have specifically different functions.

Said rotor 17 and stator 14 in connection with one another as here shown form a step type of exteriorly pressurized hydrostatic bearing structure. Said stator has a relatively wide annular primary groove 29 formed within its bore and extending about said rotor and stopping short of its ends and thus forms the peripheral steps or lands 31 and 32 respectively at each end thereof. The clearance between said stator and rotor is indicated by the numeral 33, and this clearance will be referred to as bearing clearance. The bearing clearance formed by said groove 29 may be referred to as a primary passage, and the clearance at the lands 31 and 32 may be referred to as secondary or restricted passages. A good operating bearing clearance for the primary passage is a radial clearance on the order of .0004 inch and for the secondary passages a like clearance on the order of .0002 inch.

The rotor is formed to have a length somewhat greater than that of said stator whereby there is a clearance or passage 39 between the inner surface portions of said end cap 21 and the turbine 23 and the adjacent outer end or facing surface portions of said stator. Said passages 39 provide for the discharge or exhaust of fluid from the passage 33.

A central annular groove 35 within the bore of said stator forms an unrestricted inlet or supply and has running thereto the portion 36b of a supply line 36. Said supply line 36 has a restrictive needle or control valve 38 of conventional design installed therein, and running from said valve 38 to a suitable pressurized source of bearing fluid supply is the portion 36a of said supply line 36.

With reference to the control member 48, said control member here comprises a valve structure 48 which is substantially of conventional design comprising a housing or body portion 49 having an upper removable portion 49a and a lower removable base portion 49b. Upstanding from said portion 49a is a boss or bonnet 51.

Formed within said body portion 49 is a chamber 52 having a diaphragm 54 extending thereacross dividing said chamber into an upper portion 52a and a lower portion 52b. Said diaphragm is secured in a conventional manner underlying said body portion 49a.

Threaded into said boss is a hand wheel 57 having a stem 57a extending therethrough into chamber 52a having secured thereto a tension spring 55 attached to said diaphragm for adjustment thereof. Said spring is adjusted with regard to the equilibrium between the pressure in the chambers 52a and 52b on the diaphragm 54 to position a valve head 62 for the passage of a predetermined supply of turbine fluid, as will be described.

A second chamber 60 is formed within the lower portion of said housing 49 and extending partially into said base portion 49b. Said chamber 60 has an upwardly extending portion 61 of reduced width with a flared opening facing into the chamber 60 forming a valve seat 61a.

Secured to and extending downwardly from said diaphragm 54 and into the chamber 61 is a stem or rod 63 having a tapered valve head 62 at the lower end thereof to seat into said opening of said chamber 61.

A supply line 65 upstream of said valve 38 extends from the line portion 36a to within chamber 52a. A supply line 66 downstream of said valve 38 extends from the line portion 36b to within chamber 52b.

A differential pressure gauge 68 which may serve here on the order of a tachometer or flow gauge is shown installed between and tapping the lines 65 and 66.

A supply line 70 runs from a source of a suitable turbine fluid supply to the chamber 61. This line may be characterized as a turbine supply line. A line 43 runs from the chamber 60 with portions 43a and 43b thereof carrying at their respective ends turbine nozzles 41 positioned to direct the fluid flow therethrough for engagement with the turbine buckets 25 to drive said turbine 23 and the rotor 17 integral therewith.

It will be understood that the scope of the invention herein embraces the concept of a rotor as in connection with an electrical motor or other driving means embodying the use of parallel elements for the self maintenance of a predetermined speed of operation.

OPERATION

The purpose of the invention herein is to provide means for maintaining a substantially uniform speed with respect to the operation of a rotor bearing a load irrespective of a change in the load. The uniformity of speed is maintained by automatic or self adjustment for restoration of the desired speed upon a change in load.

The apparatus is initially adjusted for a given operating condition. The bearing clearance 33 is provided with fluid under a desired pressure by the supply line 36. Air is suitably used for the purposes of fluid herein. The valve 38 will be adjusted to provide a desired pressure differential with respect to the chambers 52a and 52b. The line 36a will have full line pressure from the source of supply and the line 36b will have a lesser pressure therein as determined by the valve 38. An equilibrium of forces will be established between the pressures within the chambers 52a and 52b taken with the spring 55 of the valve or control member 48 to predetermine what might be regarded as a normal position for the diaphragm 54 in a given instance.

The position of the diaphragm 54 determines the position of the valve head 62 with respect to the valve seat 61a and thus controls or governs the fluid supply driving the turbine 23 and determines the speed of the turbine and that of the rotor which is integral therewith. The gauge 68 will give a reading as to said fluid pressure differential. This reading of the pressure differential may be regarded as indicating the speed of the rotor.

The bearing clearance established between the rotor 17 and the stator 14 is one selected for a normal or desired operation of the rotor. A good operating clearance has been indicated.

The pressure in the line 66 and that in the chamber portion 52b is subject to feed back pressure from the bearing clearance 33 and as said clearance is increased or reduced, said feed back pressure will be changed inversely with respect to said change in clearance and in view of the steady supply of fluid feeding said line 36a.

The rotor will have a known radial dimension with respect to its normal or predetermined operating speed. This is the speed which it is desired to maintain. All of the initial adjustments above described are with respect to this speed. In operation, the rotor will grow or shrink with respect to and increase or decrease in its speed of rotation as it deviates from said predetermined speed responsive to changes in the load placed upon it.

When the speed of the rotor increases above its desired operating speed by a lessening or reduction in its load such as by the change in a work piece applied to the tool 22, the rotor will grow or expand and will thus reduce the bearing clearance. This is indicated by the arrows A—A in FIG. 2. Thus less fluid will be required by the reduced bearing clearance from the supply line 36b. This condition creates a feed back or a back pressure through the line 66 below the restrictive valve 38. This back pressure increases the otherwise normal pressure within the chamber 52b causing the diaphragm 54 to yield upwardly and move the valve head 62 in a direction to reduce the flow of the turbine driving fluid from the line 70 and thus the speed of the rotor is reduced. The rotor consequently will shrink to the point where as the normal bearing clearance is reestablished, the desired operating speed of the rotor will be restored.

In like manner, when the load on the rotor is increased, the rotor will as an immediate consequence have its speed reduced below the desired or predetermined rate. With a reduction in speed, the rotor will shrink and as a result the bearing clearance 33 will be increased, as indicated by the arrows B—B in FIG. 3. Thus the bearing clearance B—B will accommodate a greater volume of bearing fluid than normally required and as a result will reduce the feed back pressure upon the line 66 and as well the predetermined or normally desirable pressure within the chamber 52b and this will cause the diaphragm 55 to be deflected downwardly moving the valve head 62 downwardly to further open the valve 61a and increase the supply of fluid to drive the turbine 23 and the rotor 17 integral therewith. Thus the rotor will have its speed restored to the point of the desired bearing clearance becoming reestablished.

It is seen that any change in the speed of the rotor from a predetermined or desired rate of speed will immediately be reflected in change of pressure of chamber 52b which will cause the diaphragm 54 to move the valve head 62 to increase or decrease the supply of fluid to drive the turbine 23, as the situation may call for. The apparatus is designed to have its cooperating elements at an equilibrium at the desired or predetermined operating speed of the rotor.

To provide an example of the sensitivity of the apparatus described with respect to stabilizing or maintaining a desired operating speed of the rotor in view of a small change in the size of the rotor, with the rotor having a diameter of one inch and a desired or predetermined operating speed of 50,000 r.p.m., it has been found that a one percent change in rotor speed produces a two percent growth change in said rotor and this two percent growth change produces a six percent change in air flow. Thus, at the operating speed indicated, a small change in speed results in a substantial change in air flow requirements with respect to the bearing clearance and has a substantial effect on pressure within chamber 52b for quick restoration of the rotor to its desired rate of operating speed. Corresponding changes are present with respect to different desired or predetermined operating speeds.

Thus, it is seen that we have provided a simple and effective self-governing apparatus including a rotor with respect to maintaining a desired operating speed irrespective of the load placed upon the rotor.

It will of course be understood that various changes may be made in the form, details, arrangement and proportions of the parts, without departing from the scope of the invention herein which, generally stated, consists in an apparatus capable of carrying out the objects above set forth, in the parts and combinations of parts disclosed and defined in the appended claims.

What is claimed is:
1. A speed sensing device having in combination,
  a rotor, a stator with respect to said rotor providing annular clearance therebetween, means supplying fluid under pressure to said clearance, means sensing variation of speed of said rotor by sensing variation in the flow rate of said fluid as a function of said rotor speed, and means governing the speed of said rotor responsive to said flow rate sensing means.

2. A speed governing apparatus in connection with a rotor having in combination, a stator, a rotor in connection with said stator having an annular clearance therebetween comprising a passage, a supply line communicating with said passage and having a restricting means therein, fluid under a predetermined pressure running through said supply line, a control member comprising a chamber, a diaphragm disposed across said chamber, a supply line between said restricting means and said passage communicating with said chamber at one side of said diaphragm, a supply line at the side of said restricting means remote from said passage communicating with said chamber at the other sde of said diaphragm, said restricting means carried by said supply line establishing a differential in pressure between said second and third mentioned supply lines, means in connection with said control member establishing an equilibrium of pressure at either side of said diaphragm with respect to said second and third mentioned supply lines, a turbine driving said rotor, means driving said turbine and said rotor therewith at a predetermined rate of speed, means operated by said diaphragm adjustably governing said last mentioned means, whereby a change in the clearance of said passage resulting from a change in speed of said rotor changes the pressure at said one side of said diaphragm and said diaphragm adjusts said means driving said turbine to restore said rotor to said predetermined rate of speed.

3. The structure set forth in claim 2, including means to indicate the difference in pressure of said first mentioned supply line above and below said restricting means carried thereby.

4. A speed governing apparatus in connection with a rotor having in combination, a stator, a rotor in connection with said stator having an annular clearance therebetween forming a passage, a supply line communicating with said passage, a fluid under a predetermined pressure running through said supply line, means driving said rotor at a predetermined rate of speed, a control member adjustably governing said means, said control member comprising a valve, a chamber within said valve, a diaphragm disposed across said chamber, an equilibrium of pressure within said chamber bearing on each side of said diaphragm, a second chamber with respect to said control member comprising a valve seat, said driving means comprising a fluid, means conducting said fluid to said valve seat, a valve operated by said diaphragm adjusting the opening in said valve seat, a turbine engaging said rotor, a supply line running from said second chamber to adjacent said turbine conducting said last mentioned fluid for engagement with said turbine, a second supply line for communication between said first mentioned supply line and said control member in advance of said passage, said first mentioned fluid running through said second mentioned supply line to said control member under a predetermined feed back pressure from said passage, whereby the feed back pressure of said fluid through said second supply line affects the equilibrium of pressure in said first chamber upon said diaphragm for adjustment of said valve head in said valve seat to control the supply of fluid to said turbine and determine the speed thereof.

5. A speed sensing device having in combination, a stator, a rotor in connection with said stator having a predetermined clearance therebetween, means supplying fluid to said clearance at a given pressure with respect to said clearance as determined by a predetermined rate of speed of said rotor, the diameter of said rotor varying in proportion to its rate of speed, means driving said rotor, and means governing said last mentioned means and communicating with said fluid supplied to said clearance and being responsive to changes in feed back pressure of said fluid resulting from changes in said rate of flow of said fluid as said clearance changes with the load placed on said rotor and the resulting change in speed of said rotor, whereby said governing means modifies said rotor driving means in an inverse relation to change in said rate of flow to restore said rotor to its predetermined rate of speed.

References Cited

UNITED STATES PATENTS

| | | | |
|---|---|---|---|
| 3,251,633 | 5/1966 | Mohsin | 308—5 |
| 3,266,854 | 8/1966 | Aller | 308—5 |
| 3,103,364 | 9/1963 | Macks et al. | 253—50 X |
| 3,105,631 | 10/1963 | Hänny. | |
| 3,306,375 | 2/1967 | Macks | 253—2 X |
| 3,341,173 | 9/1967 | Garrett. | |
| 3,227,418 | 1/1966 | West. | |
| 3,293,955 | 12/1966 | Malmgren | 253—2 X |

EVERETTE A. POWELL, JR., Primary Examiner

U.S. Cl. X.R.

415—49, 503